United States Patent
Suh et al.

(10) Patent No.: US 9,485,652 B2
(45) Date of Patent: Nov. 1, 2016

(54) METHOD AND SYSTEM FOR MANAGING MOBILITY OF MOBILE STATION IN A MOBILE COMMUNICATION SYSTEM USING MOBILE IP

(75) Inventors: Kyung-Joo Suh, Seoul (KR); Dae-Gyun Kim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 763 days.

(21) Appl. No.: 12/120,006

(22) Filed: May 13, 2008

(65) Prior Publication Data

US 2008/0287102 A1    Nov. 20, 2008

(30) Foreign Application Priority Data

May 14, 2007 (KR) .................. 10-2007-0046302

(51) Int. Cl.
| | |
|---|---|
| *H04M 3/16* | (2006.01) |
| *H04W 12/06* | (2009.01) |
| *H04L 29/06* | (2006.01) |
| *H04W 80/04* | (2009.01) |

(52) U.S. Cl.
CPC ............. *H04W 12/06* (2013.01); *H04L 63/06* (2013.01); *H04L 63/0869* (2013.01); *H04W 80/04* (2013.01)

(58) Field of Classification Search
USPC ................. 455/406, 410–411, 414.1, 458
See application file for complete search history.

(56) References Cited

U.S. PATENT DOCUMENTS

| | | | | |
|---|---|---|---|---|
| 6,466,964 | B1 * | 10/2002 | Leung .................. | H04L 63/08 709/202 |
| 7,227,863 | B1 * | 6/2007 | Leung .................. | H04W 8/12 370/390 |
| 7,716,723 | B1 * | 5/2010 | Taylor .................. | H04L 63/08 380/273 |
| 2005/0259626 | A1 * | 11/2005 | Devarapalli ...... | H04L 29/12273 370/338 |
| 2006/0120531 | A1 * | 6/2006 | Semple ................ | H04L 9/3271 380/270 |
| 2007/0037553 | A1 * | 2/2007 | Patel .................... | H04L 63/08 455/410 |

* cited by examiner

*Primary Examiner* — Christopher M Brandt
*Assistant Examiner* — Matthew Genack
(74) *Attorney, Agent, or Firm* — The Farrell Law Firm, P.C.

(57) ABSTRACT

A method and system for managing mobility of an MS in a mobile communication system using Mobile IP are provided. It is determined whether to generate an authentication key for mutual authentication between the MS and an HA after access authentication with an AG. The authentication key is generated, if it is determined to generate the authentication key after the access authentication. An information request message is transmitted to the AG. A reply message including information allocated by an AAA server is received from the AG. A binding update message for registering mobility binding of the MS is transmitted to the HA.

20 Claims, 9 Drawing Sheets

METHOD AND SYSTEM FOR MANAGING MOBILITY OF MOBILE STATION IN A MOBILE COMMUNICATION SYSTEM USING MOBILE IP

PRIORITY

This application claims priority under 35 U.S.C. §119(a) to a Korean Patent Application filed in the Korean Intellectual Property Office on May 14, 2007 and assigned Serial No. 2007-46302, the entire disclosure of which is incorporated herein by reference.

BACKGROUND OF THE INVENTION

1. Field of the Invention

The present invention generally relates to a mobile communication system, and more particularly, to a method and system for managing the mobility of a Mobile Station (MS) in a mobile communication system using Mobile Internet Protocol (IP).

2. Description of the Related Art

In a mobile communication system such as 3rd Generation Partnership Project 2 (3GPP2) Code Division Multiple Access (CDMA) 1× and Evolution-Data Only (EV-DO), a Base Station (BS) manages radio resources, and an entity in a core network, Packet Data Serving Node (PDSN), performs a packet data communication procedure.

Conventionally, the mobile communication system provides mobility using Mobile IP in a mobile environment. However, Mobile IP version 6 (MIPv6) is not viable in Ultra Mobile Broadband (UMB), which is the next-generation 3GPP2 standard air interface. Therefore, a technique for enhancing the conventional MIPv6 is under discussion as one of solutions to more efficiently support a UMB system.

MIPv6 used in the conventional 1× or EV-DO system takes a significant amount of time for connection and call processing. Although it provides mobility compared to Simple IP, the conventional MIPv6 causes a time delay due to the time required for call processing and database management to support mobility. While technology for reinforcing authentication and safety has been introduced to overcome safety problems encountered with the conventional MIPv6, time delay results.

SUMMARY OF THE INVENTION

The present invention has been made to address at least the above problems and/or disadvantages and to provide at least the advantages described below. Accordingly, an aspect of the present invention provides a method and system for conducting safer and more efficient communications, while supporting fast mobility by MIPv6 in a mobile communication system.

Another aspect of the present invention provides a method and system for efficiently authenticating an MIPv6 MS during an initial call setup and establishing a call in a mobile communication system.

A further aspect of the present invention provides a method and system for performing MIPv6 use authentication and security on the premise that access authentication is based on Extensible Authentication Protocol (EAP) in a mobile communication system.

According to one aspect of the present invention, a method for managing mobility of an MS in a mobile communication system using Mobile IP is provided. It is determined whether to generate an authentication key for mutual authentication between the MS and a Home Agent (HA) after access authentication with an Access Gateway (AG). The authentication key is generated, if it is determined to generate the authentication key after the access authentication. An information request message is transmitted to the AG. A reply message including information allocated by an Authentication, Authorization and Accounting (AAA) server is received from the AG. A binding update message for registering mobility binding of the MS is transmitted to the HA.

In accordance with another aspect of the present invention, a system is provided for managing mobility of an MS in a mobile communication system using Mobile IP. The MS generates an authentication key, transmits an information request message to an AG, receives a replay message including information allocated by an AAA server from the AG, and transmits a binding update message including predetermined authentication information to an HA. The AAA server generates an authentication key for mutual authentication between the MS and the HA. The HA verifies the predetermined authentication information included with the binding update message with the authentication key received from the AAA server and stores the verified authentication key.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF PREFERRED EMBODIMENTS

Figure 1:
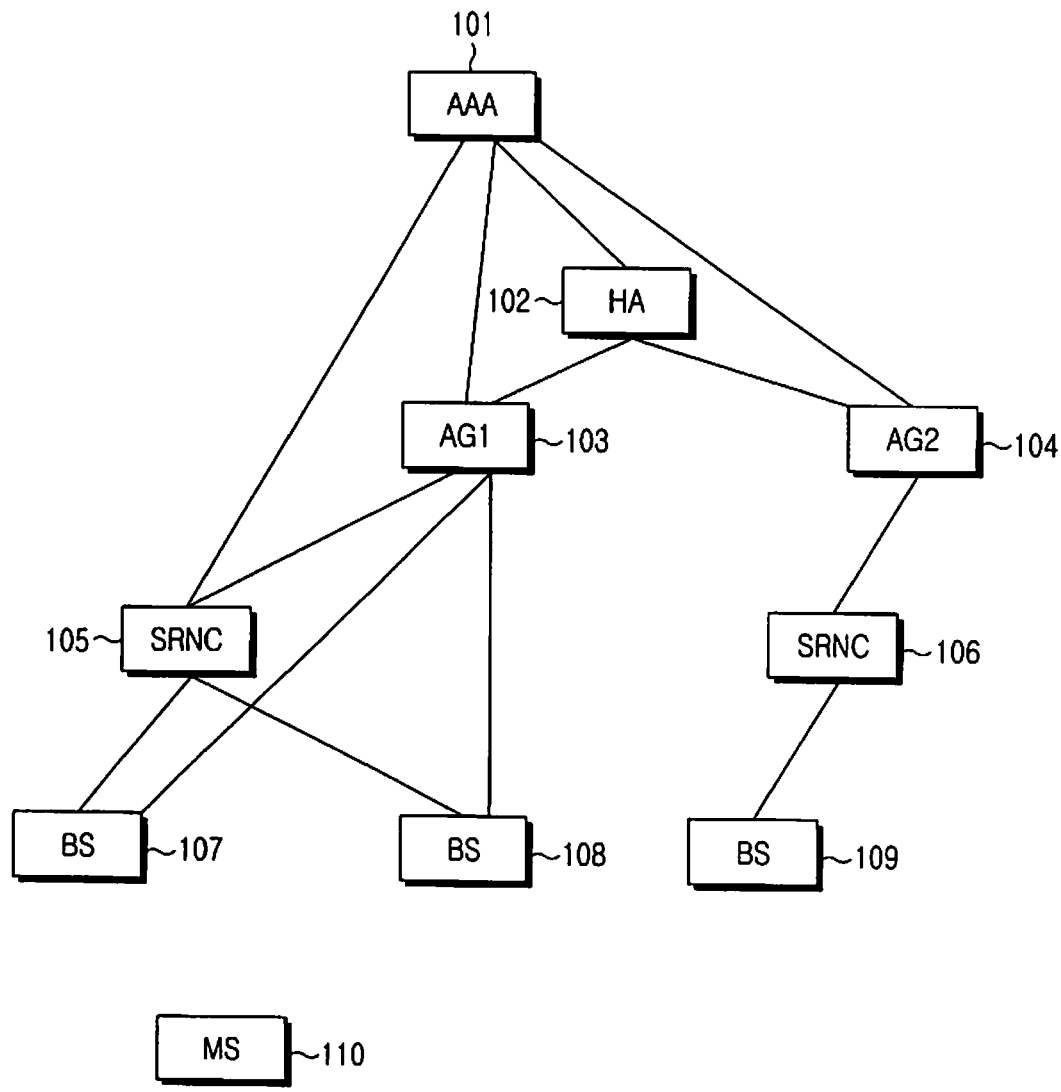
FIG. 1 is a diagram illustrating the environment of a mobile communication system according to an embodiment of the present invention.

Preferred embodiments of the present invention are described in detail with reference to the accompanying drawings. It should be noted that similar components are designated by similar reference numerals although they are illustrated in different drawings. Detailed descriptions of constructions or processes known in the art may be omitted to avoid obscuring the subject matter of the present invention.

Embodiments of the present invention provide an authentication and security method in a mobile communication system using MIPv6. The present invention will be described in the context of a 3GGPP2 UMB system. It is also applicable to a 3GPP evolved mobile communication system, an Evolved Packet Core (EPC) or an advanced Worldwide Interoperability for Microwave Access (WiMAX) system. Yet, it is to be clearly understood to those skilled in the art that the MIPv6-based authentication and security method for a mobile communication system according to the present invention can be applied to any other mobile communication system with a similar technological background and channel structure with a slight modification within the scope and spirit of the present invention.

FIG. 1 illustrates the environment of a mobile communication system according to an embodiment of the present invention. The mobile communication system environment is, for example, a network configuration of a 3GPP2 UMB system.

Referring to FIG. 1, BSs 107, 108 and 109 are wirelessly connected to an MS 110 within their cell areas and communicate with it. Signaling Radio Network Controllers (SRNCs) 105 and 106 control communications of the MS 110 through the BSs 107, 108 and 109 when the MS 110 is in idle mode.

The MS 110 is a Mobile Node (MN) that accesses a packet data network such as the Internet through AGs 103 and 104. An HA 102 and an AAA server 101 are shown as important network entities of the packet data network in FIG. 1. When the SRNCs 105 and 106 are provided with device authenticators (not shown), they will be used for device authentication by interfacing with the AAA server 101 according to the present invention.

Interfaces exist between the BSs 107, 108 and 109 and the SRNCs 105 and 106, and between the AGs 103 and 104 and the SRNCs 105 and 106, for managing the mobility of an idle-state MS. Data paths are established between the AGs 103 and 104 and the BSs 107, 108 and 109. For MS authentication, device authenticators (not shown) for device authentication reside in the SRNCs 105 and 106 and user authenticators (not shown) for user authentication are in the AGs 103 and 104. Both the device authenticators and the user authenticators may exist in the SRNCs 105 and 106 only or in the AGs 103 and 104 only. While it will be described herein that the AGs 103 and 104 and the SRNCs 105 and 106 are not configured as a single physical entity, even when the SRNCs 105 and 106 are stand-alone physical entities, the AGs 103 and 104 and the SRNCs 105 and 106 can operate as if they were incorporated into a single entity if appropriate interfaces are defined between the AGs 103 and 104 and the SRNCs 105 and 106.

According to the present invention, the MS 110, which has an MIPv6 protocol stack, may generate an address by an IPv6 address auto configuration procedure during movement. Alternatively the MS 110 may use a Home of Address (HoA) of an MN allocated by the AAA server 101, received through the AG 103 or 104, and the HA 102 may perform a Proxy Duplicate Address Detection (Proxy DAD) operation to verify the uniqueness of the HoA.

Figure 2A:
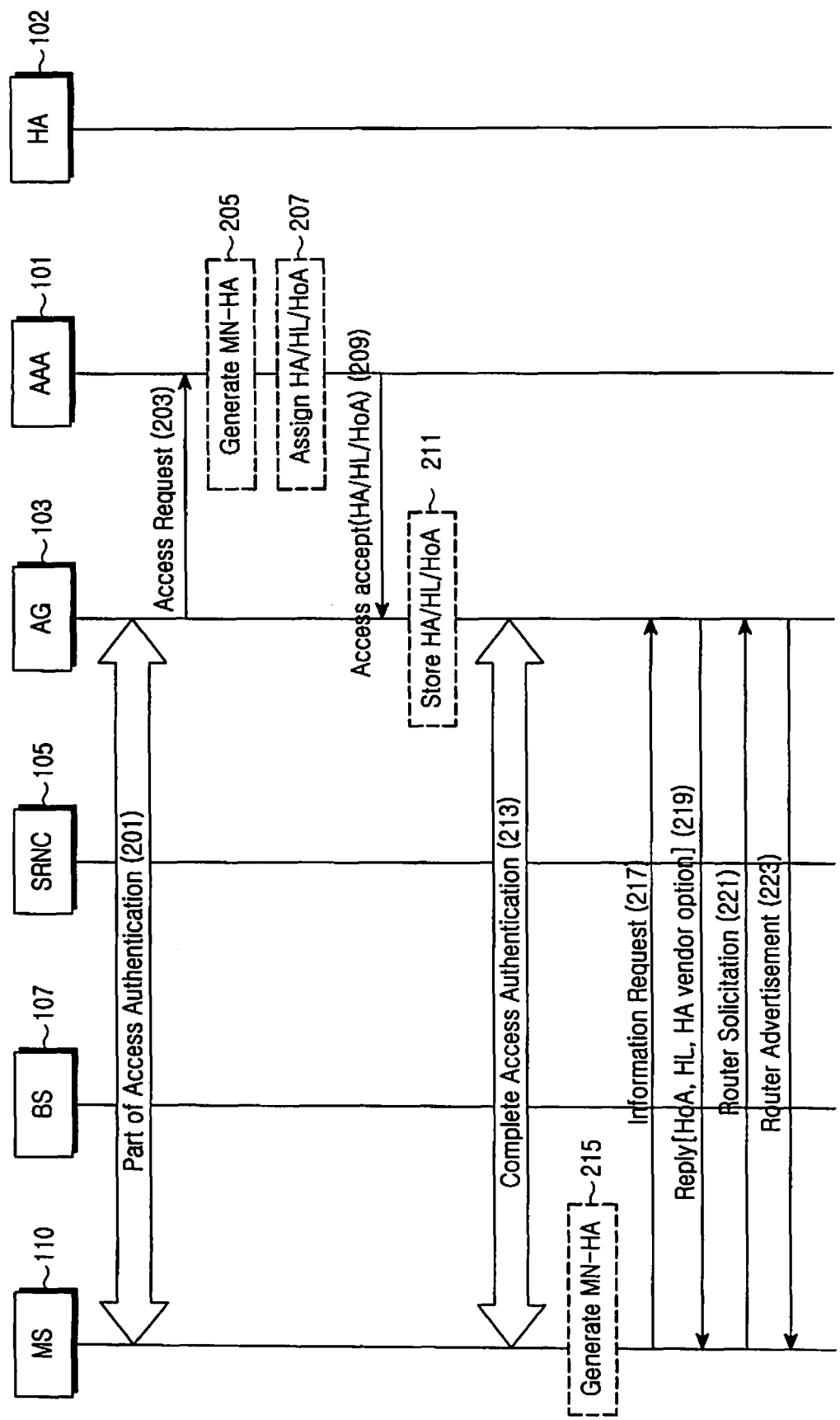
FIGS. 2A and 2B are diagrams illustrating signal flows for an access and authentication procedure according to an embodiment of the present invention.
Figure 2B:
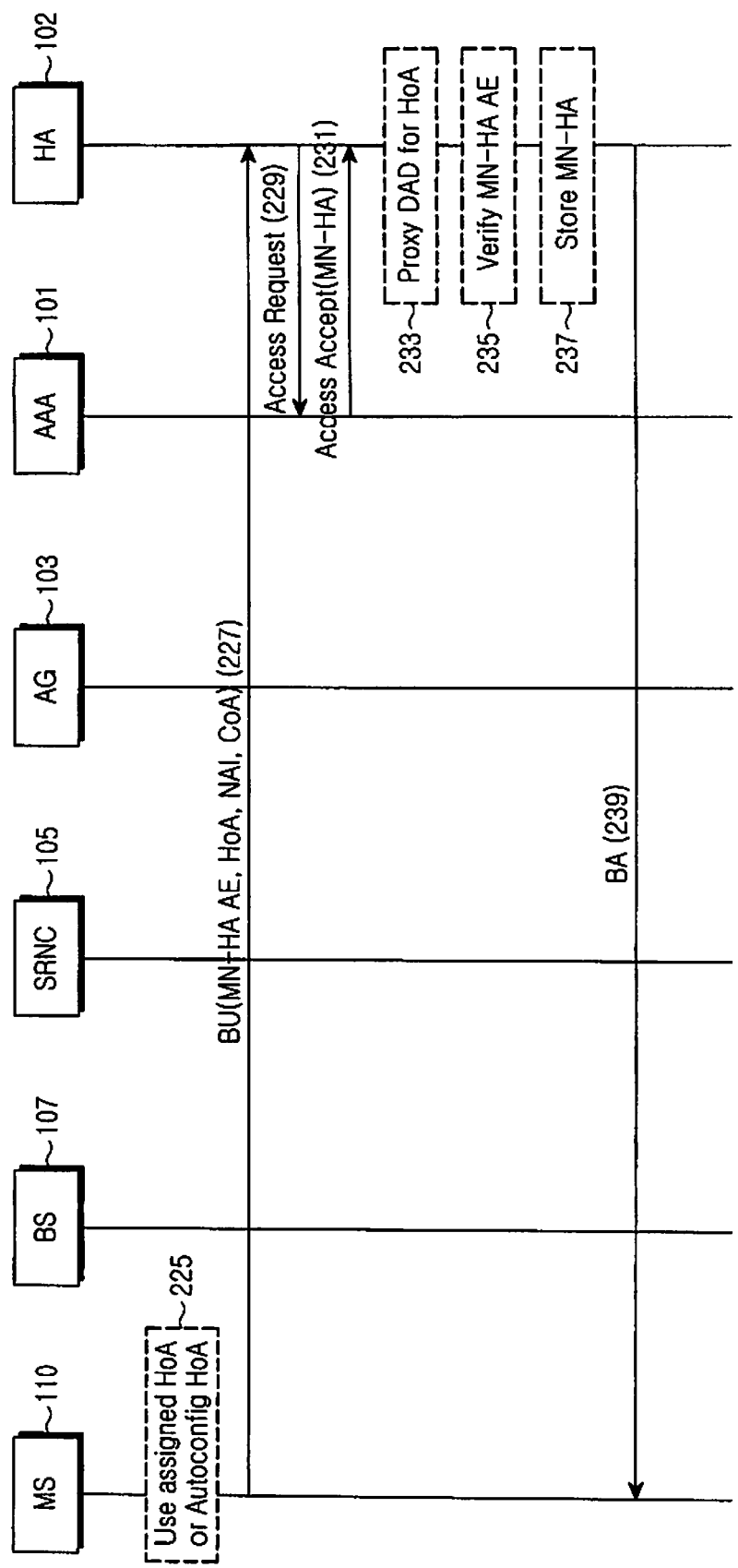

FIGS. 2A and 2B are diagrams illustrating signal flows for an access and authentication procedure according to an embodiment of the present invention.

Referring to FIGS. 2A and 2B, the MS 110 and the AG 103 perform an access authentication procedure in step 201. A plurality of procedures and a plurality of entities (e.g., an MS, a BS, an SRNC, an AG, etc.) are involved in step 201, which will not be described herein in detail because it is beyond the scope of the present invention. In step 203, the AG 103 transmits an Access Request message to the AAA server 101 in order to notify an access authentication request from the MS 110. The Access Request message covers, in its concept, Remote Authentication Dial-in User Service (RADIUS)-Access Request and Diameter-Access Request in the present invention.

The AAA server 101 generates a Mobile Node-Home Agent (MN-HA) key for mutual authentication between the MS 110 and the HA 102 in step 205. In step 207, the AAA server 101 allocates a Home Address (HA), a Home Link (HL) for use in generating an HoA of an MN, or a permanent address for the MS 110, HoA. Then the AAA server 101 transmits an Access Accept message for the Access Request message to the AG 103 in step 209. The Access Accept message covers, in its concept, RADIUS-Access Accept and Diameter-Access Accept in the present invention. The Access Accept message includes at least one of the HA, HL and HoA.

In step 211, the AG 103 stores the information allocated to the MS 110, i.e. the HA, HL or HoA included in the Access Accept message. Then the MS 110, the BS 107, the SRNC 105 and the AG 103 complete the access authentication procedure based on EAP in step 213. A plurality of procedures and a plurality of entities are involved in step 213, which will not be described herein in detail because it is beyond the scope of the present invention. Then the MS 110 generates an MN-HA key for mutual authentication with the HA 102 in step 215.

To acquire information required for registering its information to the HA 102, the MS 110 transmits an Information Request message to the AG 103, requesting information about the HoA, HL or HA in step 217. The AG 103 replies to the MS 110 with a Reply message including at least one of the HoA, HL, HA and a vendor option in step 219. The MS 110 is allocated the HA, HL or HoA by receiving the Reply message.

If the MS 110 does not acquire the HoA by the Reply message in step 219, it transmits a Router Solicitation message to the AG 103 to request transmission of a Router Advertisement message in step 221 and the AG 103 transmits the Router Advertisement message to the MS 110 in step 223. That is, in step 225, the MS 110 uses the HoA included in the Reply message received in step 219, or generates an HoA by address auto configuration in steps 221 and 223. In the latter case, the HA 102 is responsible for authenticating the HoA.

In step 227, thus, the MS 110 can transmit to the HA 102 a Binding Update (BU) message including the HoA allocated in step 219 or the HoA generated by the address auto configuration in steps 221 and 223. If the allocated HoA is used, steps 221 and 223 can be skipped.

The MS 110 transmits the BU message directly to the HA 102 to request the mobility binding of the MS 110 in step 227. The BU message includes an MN-HA Authentication Extension (AE) generated by use of the MN-HA key, the HoA, a Network Access Identifier (NAI), and a Care of Address (CoA).

Upon receipt of the BU message, the HA 102 transmits an Access Request message to the AAA server 101 to determine whether the access request of the MS 110 is to be accepted through the AAA server 101 in step 229. In step 231, the AAA server 101 replies to the HA 102 with an Access Accept message including the MN-HA key generated in step 205. Then the HA 102 performs Proxy DAD to verify the uniqueness of the HoA allocated to the MS 110 by the AAA server 101 or the HoA auto-configured by the MS 110 in step 233, verifies the MN-HA AE in step 235, and stores the MN-HA key in step 237. That is, the HA 102 verifies the MN-HA AE included in the BU message with the MN-HA key received from the AAA server 101, thereby determining whether the MS 120 is authenticated in step 235.

Steps 233 and 235 may take place simultaneously or in a different order. Then the HA 102 transmits a Binding Acknowledgment (BA) message for the BU message to the MS 110 in step 239.

Figure 3A:
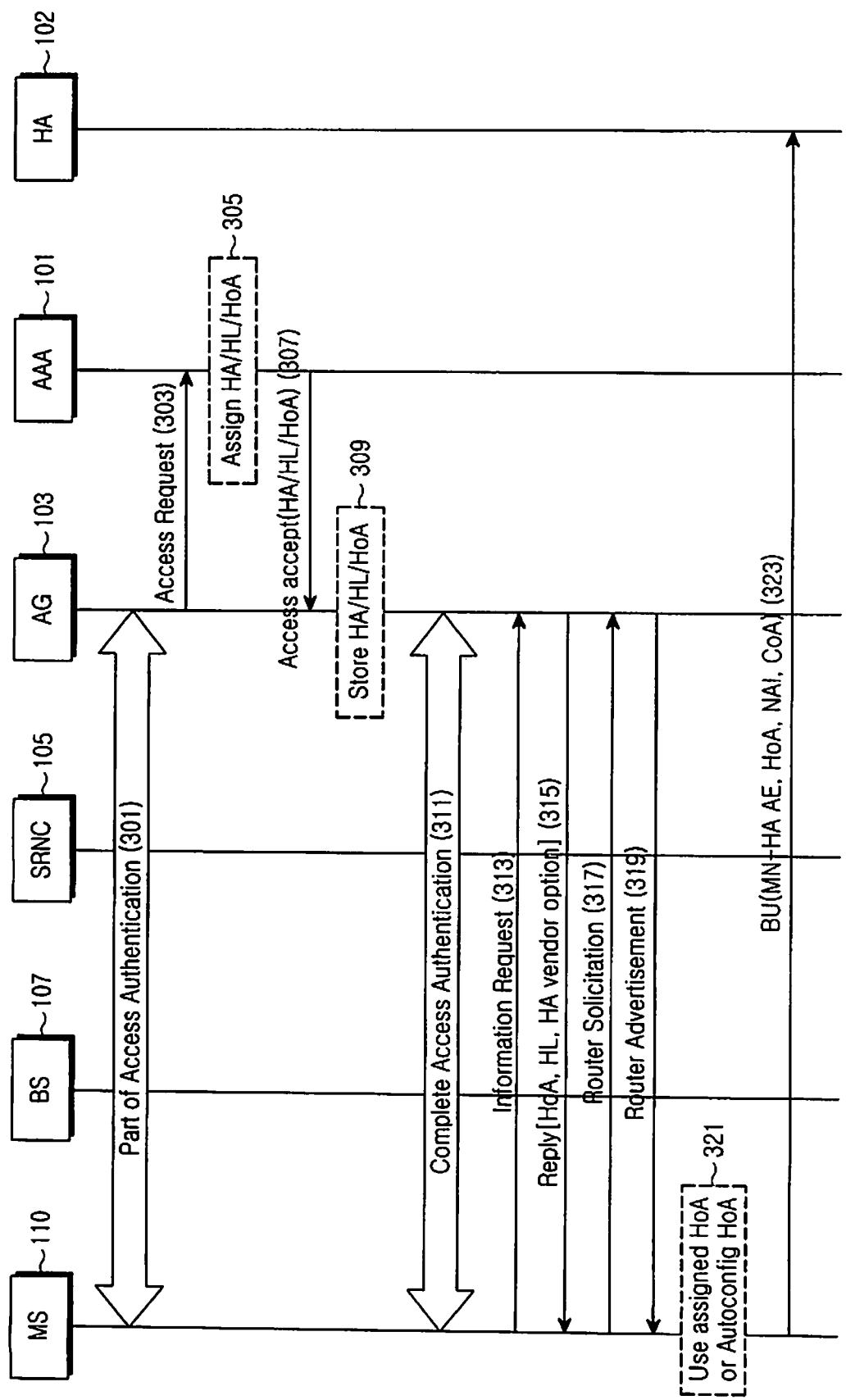
FIGS. 3A and 3B are diagrams illustrating signal flows for an access and authentication procedure according to another embodiment of the present invention.
Figure 3B:
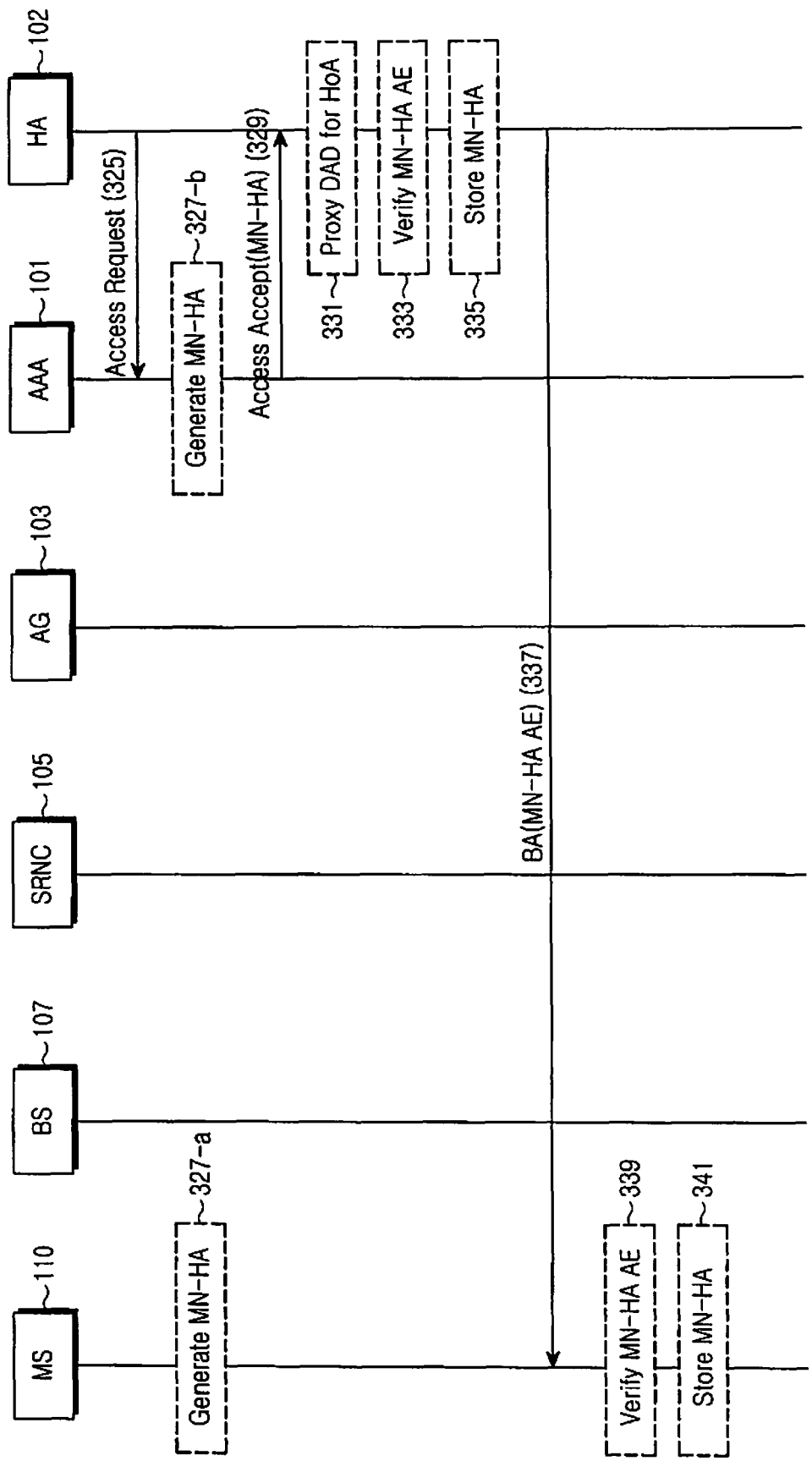

FIGS. 3A and 3B are diagrams illustrating signal flows for an access and authentication procedure according to another embodiment of the present invention.

Referring to FIGS. 3A and 3B, the MS 110, the BS 107, the SRNC 105 and the AG 103 perform an access authentication procedure in step 301. A plurality of procedures and a plurality of entities are involved in step 301, which will not be described herein in detail because it is beyond the scope of the present invention. In step 303, the AG 103 transmits an Access Request message to the AAA server 101 in order to notify an access authentication request from the MS 110. The Access Request message covers, in its concept, RADIUS-Access Request and Diameter-Access Request in the present invention. Upon receipt of the Access Request message, the AAA server 101 allocates an HA for an MN, an HL, or a permanent address for the MS 110, HoA, to the MS 110 in step 305.

Then the AAA server 101 transmits an Access Accept message for the Access Request message to the AG 103 in step 307. The Access Accept message covers, in its concept, RADIUS-Access Accept and Diameter-Access Accept in the present invention. The Access Accept message includes the allocated HA, HL or HoA. In step 309, the AG 103 stores the information allocated to the MS 110, i.e. the HA, HL or HoA included in the Access Accept message. Then the MS 110, the BS 107, the SRNC 105 and the AG 103 complete the access authentication procedure based on EAP in step 311. A plurality of procedures and a plurality of entities are involved in step 311, which will not be described herein in detail because it is beyond the scope of the present invention.

To acquire information required for MN registration to the HA 102, the MS 110 transmits an Information Request message to the AG 103, requesting information about the HoA, HL or HA in step 313. The AG 103 replies to the MS 110 with a Reply message including at least one of the HoA, HL, HA and a vendor option in step 315. Thus, the MS 110 is allocated the HA, HL or HoA by receiving the Reply message.

If the MS 110 does not acquire the HoA by the Reply message in step 315, it can generate an HoA by address auto configuration in steps 317 and 319 and, in this case, the HA 102 is responsible for authenticating the HoA. Therefore, in step 321, the MS 110 uses the allocated HoA or the auto-configured HoA. If the MS 110 uses the auto-configured HoA, steps 317 and 319 can be skipped.

The MS 110 transmits a BU message directly to the HA 102 to request its mobility binding in step 323. The BU message includes an MN-HA AE, the HoA, a NAI, and a CoA.

If an MN-HA AE is also included in a BA message that the HA 102 transmits to the MS 110 as in the second embodiment of the present invention, the MN-HA AE that the MS 110 transmits to the HA 102 can be omitted unless it is used for mutual MN-HA AE authentication between the HA 102 and the MS 110.

Upon receipt of the BU message, the HA 102 transmits an Access Request message to the AAA server 101 to determine whether the access request of the MS 110 is to be accepted in step 325.

Meanwhile, if the MS 110 transmits the BU message to the HA 102 in step 323 and the AAA server 101 receives the Access Request message from the HA 102 in step 325, the MS 110 and the AAA server 101 generate MN-HA keys for mutual authentication, respectively in steps 327-a and 327-b. In step 329, the AAA server 101 transmits an Access Accept message including the MN-HA key to the HA 102. Then the HA 102 performs Proxy DAD to verify the uniqueness of the allocated HoA or the auto-configured HoA in step 331.

If the BU message received in step 323 includes an MN-HA AE, the HA 102 verifies the MN-HA AE in step 333. However, if the MN-HA AE is not included in the BU message, step 333 is skipped. In step 335, the HA 102 stores the MN-HA key. Steps 331 and 333 may take place simultaneously or in a different order. Then the HA 102 transmits a BA message for the BU message to the MS 110 in step 337. The BA message includes the MN-HA AE generated by the HA 102 so that the MS 110 can verify the MN-HA AE. The MS 110 verifies the MN-HA AE included in the BA message in step 339 and stores the MN-HA key in step 341.

Figure 4A:
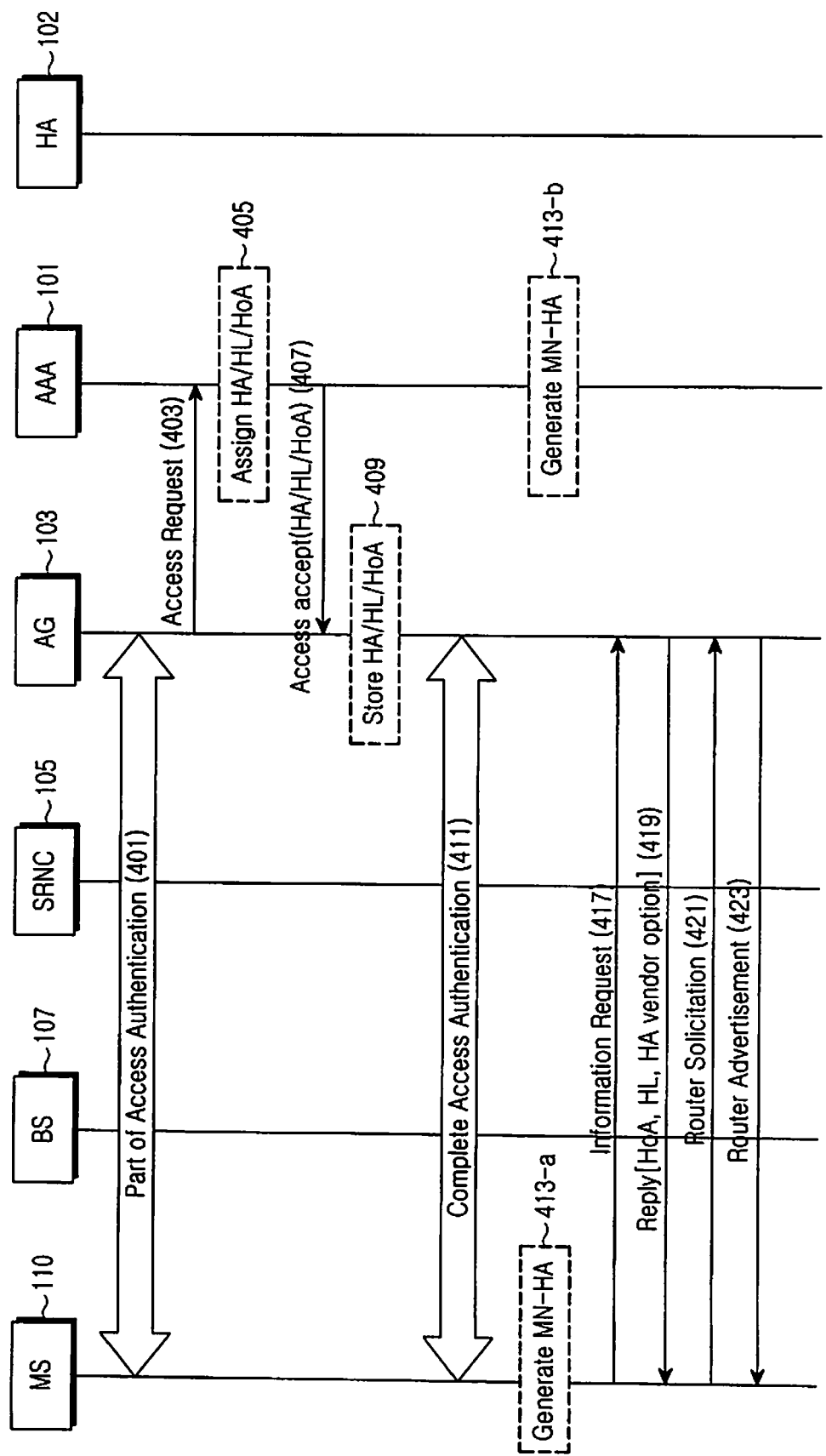
FIGS. 4A and 4B are diagrams illustrating signal flows for an access and authentication procedure according to a third embodiment of the present invention.
Figure 4B:
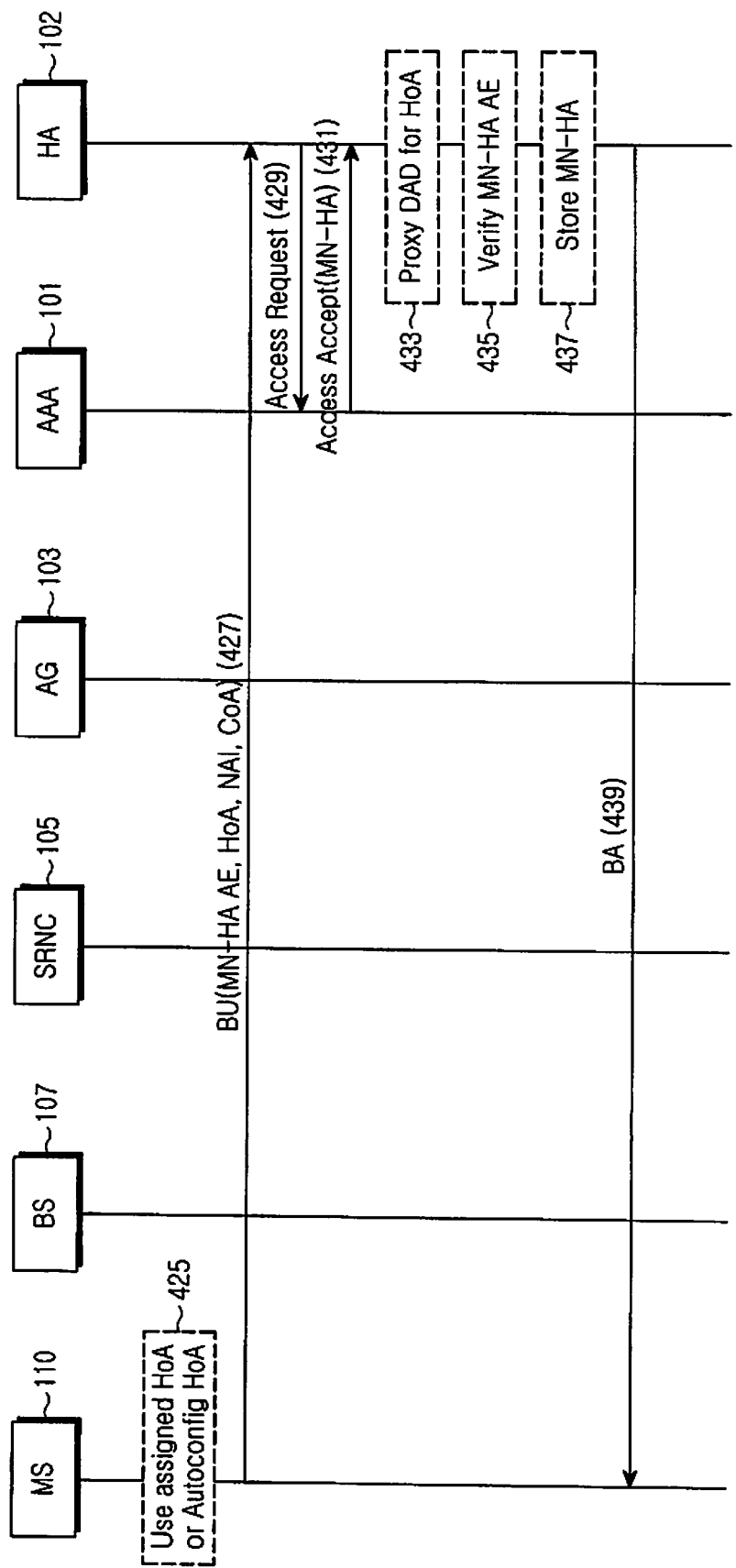

FIGS. 4A and 4B are diagrams illustrating signal flows for an access and authentication procedure according to a third embodiment of the present invention.

Referring to FIGS. 4A and 4B, the MS 110, the BS 107, the SRNC 105 and the AG 103 perform an access authentication procedure in step 401. A plurality of procedures and a plurality of entities are involved in step 401, which will not be described herein in detail because it is beyond the scope of the present invention. In step 403, the AG 103 transmits an Access Request message to the AAA server 101 in order to notify an access authentication request from the MS 110. The Access Request message covers, in its concept RADIUS-Access Request and Diameter-Access Request in the present invention.

In step 405, the AAA server 101 allocates an HA, an HL, or a permanent address of the MS 110, HoA, for the MS 110. Then the AAA server 101 transmits an Access Accept message for the Access Request message to the AG 103 in step 407. The Access Accept message includes the HA, HL or HoA allocated to the MS 110. In step 409, the AG 103 stores the information allocated to the MS 110, i.e. the HA, HL or HoA included in the Access Accept message. Then the MS 110, the BS 107, the SRNC 105 and the AG 103 complete the access authentication procedure based on EAP in step 411. A plurality of procedures and a plurality of entities are involved in step 411, which will not be described herein in detail because it is beyond the scope of the present invention.

The MS 110 and the AAA server 101 generate MN-HA keys, respectively, in steps 413-a and 413-b. Step 413-b can be performed after the AAA server 101 transmits the Access Accept message to the AG 103. Step 413-a is triggered by the completion of the EAP access authentication in step 411.

To acquire information required for MN registration to the HA 102, the MS 110 transmits an Information Request message to the AG 103, requesting information about the HoA, HL or HA in step 417. The AG 103 replies to the MS 110 with a Reply message including at least one of the HoA, HL, HA and a vendor option in step 419. Thus the MS 110 is allocated the HA, HL or HoA by receiving the Reply message. Alternatively, the MS 110 can generate an HoA by address auto configuration in steps 421 and 423. In this case, the HA 102 is responsible for authenticating the HoA.

In step 425, thus, the MS 110 can use the allocated HoA or the auto-configured HoA. If the allocated HoA is used, steps 421 and 423 can be skipped.

The MS 110 transmits the BU message to the HA 102 to request its mobility binding in step 427. The BU message includes an MN-HA AE, the HoA, a NAI, and a CoA. Upon receipt of the BU message, the HA 102 transmits an Access Request message to the AAA server 101 to determine whether the access request of the MS 110 is to be accepted in step 429. In step 431, the AAA server 101 replies to the HA 102 with an Access Accept message including an MN-HA key. Then the HA 102 performs Proxy DAD to verify the uniqueness of the allocated HoA or the auto-configured HoA in step 433, verifies the MN-HA AE in step 435, and stores the MN-HA key in step 437. Steps 433 and 435 may take place simultaneously or in a different order. Then the HA 102 transmits a BA message for the BU message to the MS 110 in step 439.

Figure 5:
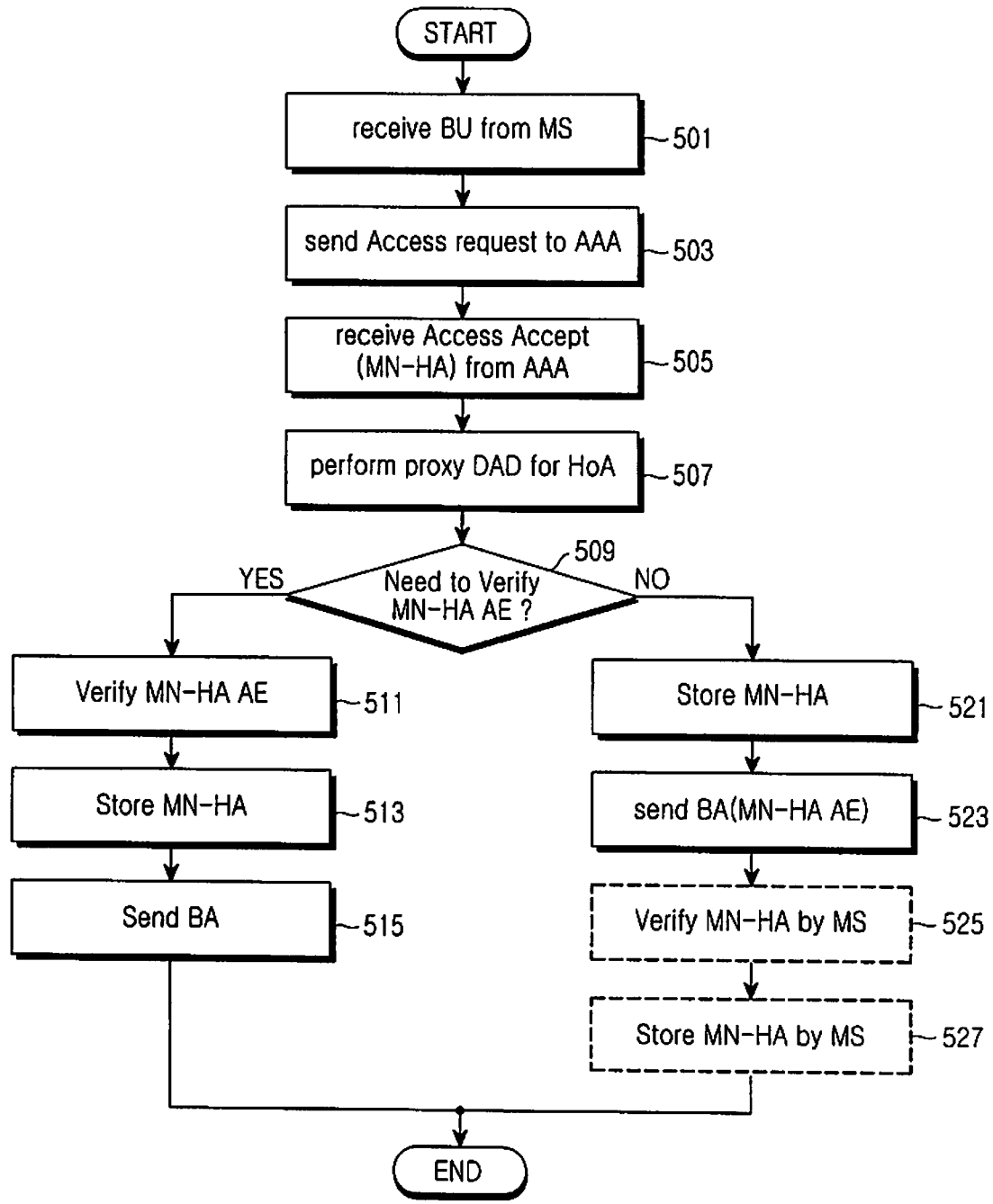
FIG. 5 is a flowchart illustrating an operation of an HA according to an embodiment of the present invention.

FIG. 5 is a flowchart illustrating an operation of the HA 102 according to an embodiment of the present invention.

Referring to FIG. 5, the HA 102 receives a BU message from the MS 110 in step 501 and transmits an Access Request message to the AAA server 101 in step 503. Upon receipt of an Access Accept message including an MN-HA key from the AAA server 101 in step 505, the HA 102 performs Proxy DAD for an HoA of the MN in step 507. Then the procedure branches into two flows depending on whether an MN-HA AE needs to be verified in step 509.

The flow branching in step 509 depends on whether the BU message includes an MN-HA AE or depends on a system policy. If the MN-HA AE needs to be verified in step 509, the HA 102 verifies the MN-HA AE received by the BU message using the MN-HA key received from the AAA server 101 in step 511. Then the HA 102 stores the MN-HA key in step 513 and transmits a BA message to the MS 110 in step 515.

Otherwise, if the MN-HA AE is verified just for confirming the integrity of the BU message in step 509, the MS 110 should be able to verify an MN-HA key based on an MN-HA AE. Therefore, the HA 102 stores the MN-HA key in step 521 and transmits a BA message including an MN-HA AE to the MS 110 in step 523. Then the MS 110 verifies the MN-HA AE by an MN-HA key that it has in step 525 and stores the MN-HA key in step 527.

Figure 6:
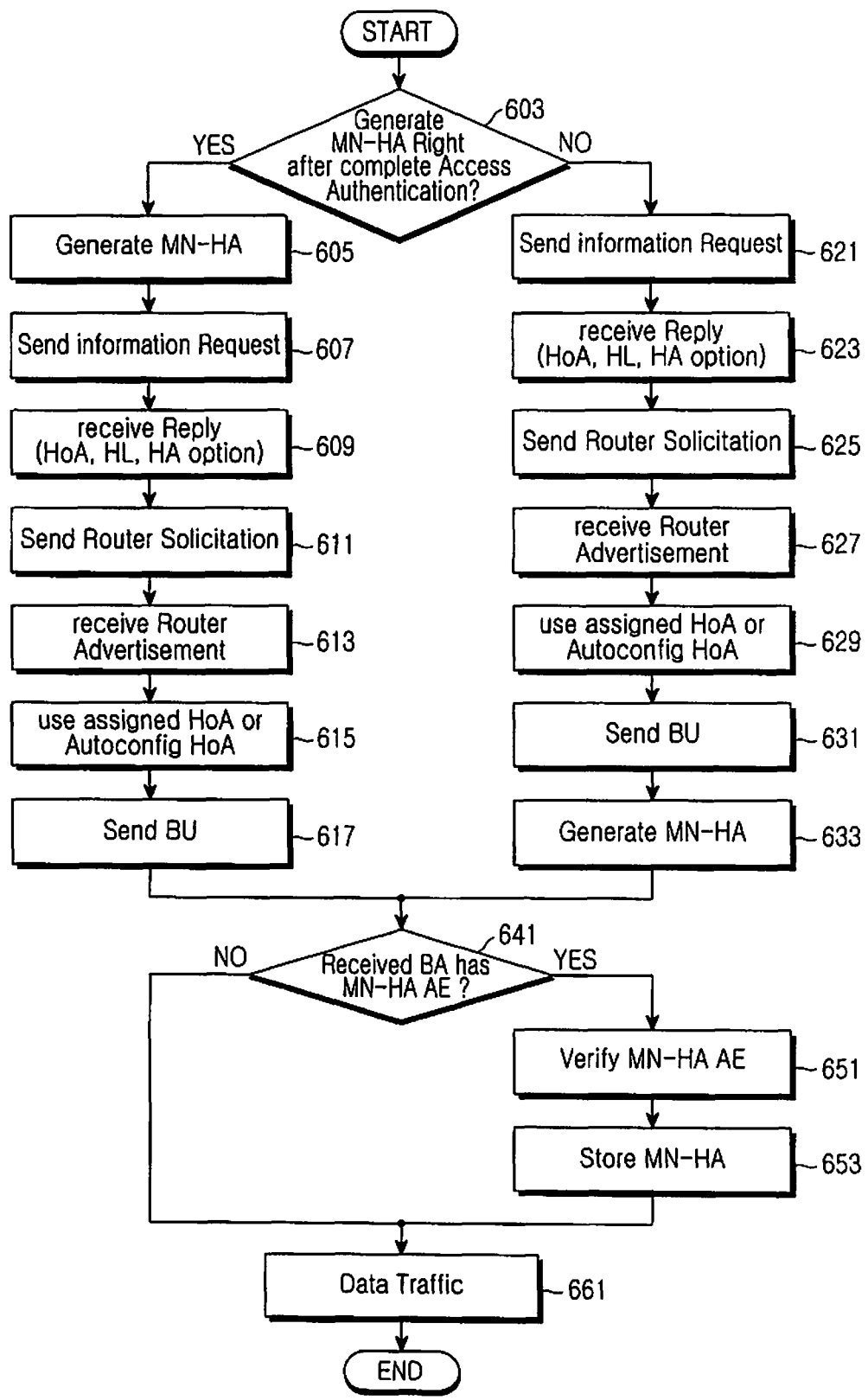
FIG. 6 is a flowchart illustrating an operation of an MS according to an embodiment of the present invention.

FIG. 6 is a flowchart illustrating an operation of the MS according to an embodiment of the present invention.

Referring to FIG. 6, the operation of the MS 110 branches off into two flows depending on if it generates an MN-HA key right after access authentication. When the MN-HA key is to be generated right after the access authentication in step 603, the MS 110 generates the MN-HA key in step 605, transmits an Information Request message to the AG 103 in step 607, and receives a Reply message including at least one of an HoA, an HL, and an HA from the AG 103 in step 609. Steps 611 and 613 are the process of auto-configuring an HoA by the MS 110, when an allocated HoA is not used. Specifically, the MS 110 transmits a Router Solicitation message to the AG 103 in step 611 and receives a Router Advertisement message from the AG 103, thereby auto-configuring the HoA in step 613. The MS 110 uses the allocated HoA or the auto-configured HoA in step 615 and transmits a BU message by use of the HoA to the HA 102 in step 617.

On the other hand, if the MN-HA key is not to be generated right after the access authentication in step 603, the MS 110 transmits an Information Request message to the AG 103 in step 621 and receives a Reply message including at least one of an HoA, an HL, and an HA from the AG 103 in step 623. Steps 625 and 627 are the process of auto-configuring an HoA by the MS 110, when an allocated HoA is not used. Specifically, the MS 110 transmits a Router Solicitation message to the AG 103 in step 625 and receives a Router Advertisement message from the AG 103, thereby auto-configuring the HoA in step 627. The MS 110 uses the allocated HoA or the auto-configured HoA in step 629 and transmits a BU message by use of the HoA to the HA 102 in step 631. In step 633, the MS 110 generates the MN-HA key.

The subsequent process varies depending on whether the MS 110 receives a BA including an MN-HA AE from the HA 102 in step 641. If the BA message does not include an MN-HA AE in step 641, which implies a tunnel has been established successfully based on the BU message and the BA message, the MS 110 can conduct data communications in step 661. On the other hand, if the BA message includes an MN-HA AE in step 641, which implies that the MS 110 needs to verify the MN-HA AE, the MS 110 verifies the MN-HA AE set in the BA message with the MN-HA key that it has generated in step 651 and stores the MN-HA key in step 653. As the tunnel establishment is completed, the MS 110 can conduct data communications in step 661.

As is apparent from the above description, the present invention advantageously solves the problem of a data delay and a call process delay encountered with Mobile IP.

Also, the present invention overcomes a time delay involved in a call setup and a time delay involved in a call re-setup during an MS's movement. Furthermore, since IP call process-related authentication is performed during a Mobile IP process, data communications are efficiently conducted.

While the invention has been shown and described with reference to certain preferred embodiments thereof, it will be understood by those skilled in the art that various changes in form and details may be made therein without departing from the spirit and scope of the present invention as defined by the appended claims and their equivalents.

What is claimed is:

1. A method for managing mobility of a mobile station (MS) in a mobile communication system using mobile internet protocol (IP), comprising the steps of:
   determining, by the MS, whether to generate a first authentication key for mutual authentication between the MS and a home agent (HA) after access authentication with an access gateway (AG); and
   if it is determined to generate the first authentication key after the access authentication, generating, by the MS, the first authentication key;
   transmitting, by the MS, an information request message to the AG;
   receiving, by the MS, in response to the information request message, a reply message including information allocated by an authentication, authorization, and accounting (AAA) server from the AG; and
   transmitting, by the MS, a binding update message for registering mobility binding of the MS to the HA; and
   determining, by the MS, whether a binding acknowledgment message, which is transmitted upon receipt of an access accept message transmitted by the AAA server to the HA, including predetermined authentication information has been received from the HA,
   wherein the binding update message includes a mobile node-home agent authentication extension (MN-HA AE) generated using the first authentication key, a home of address (HoA), and a network access identifier (NAI),
   wherein the access accept message includes a second authentication key for mutual authentication between the MS and the HA, and the second authentication key is generated by the AAA server.

2. The method of claim 1, wherein the allocated information includes at least one of the HoA, a home link (HL), and a home address.

3. The method of claim 1, wherein the binding update message further includes a care of address (CoA).

4. The method of claim 1, further comprising generating, by the MS, an HoA by address auto configuration, if the allocated information is not received in the reply message from the AG.

5. The method of claim 4, wherein the address auto configuration comprises:
transmitting, by the MS, a router solicitation message to the AG by the MS; and
receiving, by the MS, a router advertisement message in response to the router solicitation message from the AG at the MS.

6. The method of claim 1, further comprising, after transmitting the binding update message to the HA:
verifying, by the MS, the predetermined authentication information using the first authentication key generated by the MS, upon receipt of the binding acknowledgment message from the HA; and
storing, by the MS, the first authentication key.

7. The method of claim 6, wherein the predetermined authentication information comprises an MN-HA AE.

8. The method of claim 1, wherein, if it is determined not to generate the first authentication key after the access authentication, further comprising:
transmitting, by the MS, an information request message to the AG;
receiving, by the MS, a reply message information allocated by the AAA server from the AG;
transmitting, by the MS, a binding update message for registering mobility binding of the MS to the HA; and
generating, by the MS, the first authentication key, after transmitting the binding update message.

9. The method of claim 8, wherein the allocated information comprises at least one of an HoA, an HL, and a home address.

10. The method of claim 8, wherein the binding update message comprises at least one of an MN-HA AE, an HoA, a NAI, and a CoA.

11. The method of claim 8, further comprising generating an HoA by address auto configuration, if the allocated information is not received in the reply message from the AG.

12. The method of claim 11, wherein the address auto configuration comprises:
transmitting a router solicitation message to the AG by the MS; and
receiving a router advertisement message in response to the router solicitation message from the AG by the MS.

13. A method for managing mobility of a mobile station (MS) in a home agent (HA) in a mobile communication system using mobile internet protocol (IP), comprising the steps of:
receiving a binding update message including predetermined authentication information generated using a first authentication key for mutual authentication between the MS and the HA, the first authentication key being generated by the MS;
receiving an access accept message including a second authentication key for mutual authentication between the MS and HA from an authentication, authorization and accounting (AAA) server, the second authentication key being generated by the AAA server;
verifying the predetermined authentication information included in the binding update message with the second authentication key;
transmitting a binding acknowledgment message to the MS, which is transmitted upon receipt of the access accept message transmitted by the AAA server to the HA; and
storing the second authentication key,
wherein the predetermined authentication information includes a mobile node-home agent authentication extension (MN-HA AE) generated using the first authentication key, a home of address (HoA), and a network access identifier (NAI).

14. The method of claim 13, wherein the predetermined authentication information further includes a care of address (CoA).

15. A system for managing mobility of a mobile station (MS) in a mobile communication system using mobile internet protocol (IP), comprising:
the MS for generating a first authentication key for mutual authentication between the MS and a home agent (HA), transmitting an information request message to an access gateway (AG), receiving a replay message including information allocated by an authentication, authorization, and accounting (AAA) server from the AG, transmitting, to the HA, a binding update message including predetermined authentication information generated using the first authentication key, and determining whether a binding acknowledgment message, which is transmitted upon receipt of an access accept message transmitted by the AAA server to the HA, including predetermined authentication information has been received from the HA;
the AAA server for generating a second authentication key for mutual authentication between the MS and the HA; and
the HA for verifying the predetermined authentication information included with the binding update message with the second authentication key received from the AAA, and storing the second authentication key,
wherein the predetermined authentication information includes a mobile node-home agent authentication extension (MN-HA AE) generated using the first authentication key, a home or address (HoA), and a network access identifier (NAI).

16. The system of claim 15, wherein the predetermined authentication information further includes a care of address (CoA).

17. The system of claim 15, wherein the allocated information includes at least one of the HoA, a home link (HL), and a home address.

18. The system of claim 15, wherein the MS generates an HoA by address auto configuration, if the allocated information is not received in the reply message from the AG.

19. The system of claim 18, wherein for the address auto configuration, the MS transmits a router solicitation message to the AG and receives a router advertisement message in response to the router solicitation message from the AG.

20. The system of claim 15, wherein after transmitting the binding update message to the HA, the MS verifies the predetermined authentication information using the first authentication key generated by the MS, upon receipt of the binding acknowledgment message from the HA, and stores the first authentication key.

* * * * *